(12) United States Patent
Tsou et al.

(10) Patent No.: US 7,226,962 B2
(45) Date of Patent: Jun. 5, 2007

(54) HALOGENATED ISOBUTYLENE-BASED COPOLYMERS HAVING ENHANCED VISCOSITY AND THERMOPLASTIC COMPOSITIONS THEREOF

(75) Inventors: Andy H. Tsou, Houston, TX (US); Hsien-Chang Wang, Bellaire, TX (US); Kenneth O. McElrath, Houston, TX (US); Ilan Duvdevani, Houston, TX (US); Michael K. Lyon, Houston, TX (US); Mun Fu Tse, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 415 days.

(21) Appl. No.: 10/476,541

(22) PCT Filed: Apr. 30, 2002

(86) PCT No.: PCT/US02/13440

§ 371 (c)(1),
(2), (4) Date: Oct. 31, 2003

(87) PCT Pub. No.: WO02/100938

PCT Pub. Date: Dec. 19, 2002

(65) Prior Publication Data

US 2004/0147639 A1    Jul. 29, 2004

Related U.S. Application Data

(60) Provisional application No. 60/296,714, filed on Jun. 7, 2001.

(51) Int. Cl.
C08K 9/04    (2006.01)
C08K 3/34    (2006.01)
C08K 3/36    (2006.01)

(52) U.S. Cl. .................. 523/213; 524/445; 524/493

(58) Field of Classification Search ................. 523/213; 524/445, 493
See application file for complete search history.

(56) References Cited

U.S. PATENT DOCUMENTS

| | | | |
|---|---|---|---|
| 3,037,954 A | 6/1962 | Gessler et al. | 260/29.8 |
| 4,130,534 A | 12/1978 | Coran et al. | 260/42.36 |
| 4,130,535 A | 12/1978 | Coran et al. | 260/33.6 |
| 4,594,390 A | 6/1986 | Abdou-Sabet et al. | 525/232 |
| 5,013,793 A | 5/1991 | Wang et al. | 525/195 |
| 5,021,500 A | 6/1991 | Puydak et al. | 524/525 |
| 5,051,477 A | 9/1991 | Yu et al. | 525/194 |
| 5,162,445 A | 11/1992 | Powers et al. | 525/333.4 |
| 5,177,147 A | 1/1993 | Spenadel et al. | 525/88 |
| 5,290,886 A | 3/1994 | Ellul | 524/515 |
| 5,453,465 A | 9/1995 | Yu et al. | 525/179 |
| 5,698,619 A | 12/1997 | Cohen et al. | 524/188 |
| 5,700,871 A | 12/1997 | Arjunan et al. | 525/74 |
| 6,060,563 A | 5/2000 | Peiffer et al. | 525/213 |
| 6,069,202 A | 5/2000 | Venkataswamy et al. | 525/66 |
| 6,133,364 A | 10/2000 | Obrecht et al. | 524/495 |
| 6,201,054 B1 | 3/2001 | Hara et al. | 524/492 |
| 6,207,757 B1 | 3/2001 | Obrecht et al. | 525/194 |
| 6,374,889 B1 | 4/2002 | McElrath et al. | 152/525 |
| 6,414,081 B1 | 7/2002 | Ouhadi | 525/66 |

FOREIGN PATENT DOCUMENTS

| | | |
|---|---|---|
| EP | 1 111 004 | 6/2001 |
| WO | WO 92/02582 | 2/1992 |
| WO | WO 94/10214 | 5/1994 |
| WO | WO 98/40415 | 9/1998 |
| WO | WO 98/53000 | 11/1998 |
| WO | EP 0 890 602 | 1/1999 |
| WO | WO 99/31178 | 6/1999 |
| WO | WO 00/69976 | 11/2000 |

*Primary Examiner*—Tae H Yoon
(74) *Attorney, Agent, or Firm*—Xiaobing Feng

(57) ABSTRACT

The invention provides a method for increasing the viscosity of halogenated (brominated) elastomeric copolymers of a $C_4$ to $C_7$ isomonoolefin (isobutylene) and a para-alkylstryrene (p-methylstyrene) by mixing the copolymer with a silica or clay particulate filler which has been contacted with an aminosilane containing at least one $C_1$ to $C_4$ alkoxy group and at least one primary, secondary or tertiary amine group. The resulting elastomer compositions are used to prepare thermoplastic elastomer blend compositions, containing more finely dispersed elastomers which results in compositions having improved mechanical properties.

33 Claims, No Drawings

HALOGENATED ISOBUTYLENE-BASED COPOLYMERS HAVING ENHANCED VISCOSITY AND THERMOPLASTIC COMPOSITIONS THEREOF

CROSS REFERENCE TO RELATED APPLICATIONS

This application is a National Stage Application of International Application No. PCT/US02/13440, filed Apr. 30, 2002, which claims the benefit of Provisional Application No. 60/296,714, filed Jun. 7, 2001.

FIELD OF THE INVENTION

The invention relates to halogenated copolymers of a $C_4$ to $C_7$ isomonoolefin and a para-alkylstyrene having enhanced viscosity and thermoplastic compositions containing these copolymers.

BACKGROUND

A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

Polymer blends which have a combination of both thermoplastic and elastic properties are generally obtained by combining a thermoplastic polymer with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisoprene in an uncured matrix of thermoplastic polymer such as polypropylene.

Depending on the ultimate application, such thermoplastic elastomer (TPE) compositions may comprise one or a mixture of thermoplastic materials such as propylene homopolymers and propylene copolymers and like thermoplastics used in combination with one or a mixture of cured or non-cured elastomers such as ethylene/propylene rubber, EPDM rubber, diolefin rubber, butyl rubber or similar elastomers. TPE compositions may also be prepared where the thermoplastic material used is an engineering resin having good high temperature properties, such as a polyamide or a polyester, used in combination with a cured or non-cured elastomer. Examples of such TPE compositions and methods of processing such compositions, including methods of dynamic vulcanization, may be found in U.S. Pat. Nos. 4,130,534, 4,130,535, 4,594,390, 5,021,500, 5,177,147 and 5,290,886, as well as in WO 92/02582. Other examples of elastomeric compositions including silane-type fillers include EP 1 111 004 A1, EP 0 890 602 A1; and WO 99/31178.

Particularly preferred elastomeric polymers useful for preparing TPE compositions are halogenated random copolymers comprising at least 50 mole % of a $C_4$ to $C_7$ isomonoolefin (isobutylene) copolymerized with less than 50 mole % of para-alkylstyrene (p-methylstyrene). Elastomeric copolymers of this type (referred to as BIMS polymers) and their method of preparation are disclosed in U.S. Pat. No. 5,162,445. Curable TPE compositions containing these copolymers are described in U.S. Pat. Nos. 5,013,793 and 5,051,477, among others.

TPE compositions are normally prepared by melt mixing or melt processing the thermoplastic and elastomeric components at temperatures in excess of 150° C. and under high shear mixing conditions (shear rate greater than 100 l/sec or $sec^{-1}$) in order to achieve a fine dispersion of one polymer system within a matrix of the other polymer system. The finer the dispersion, the better are the mechanical properties of the TPE product.

Due to the flow activation and shear thinning characteristic inherent in such BIMS polymers, reductions in viscosity values these polymers at increased temperatures and shear rates encountered during mixing are much more pronounced than reductions in viscosity of the thermoplastic component with which the BIMS polymer is blended. However, minimization of the viscosity differential between the BIMS and thermoplastic components during mixing and/or processing is essential for the provision of uniform mixing and fine blend morphology that are critical for good blend mechanical properties.

SUMMARY OF THE INVENTION

This invention provides a composition comprising a mixture of (a) a halogenated elastomeric copolymer of a $C_4$ to $C_7$ isomonoolefin and a para-alkylstyrene; and (b) at least one silica or clay filler which has been contacted with at least one aminosilane containing at least one $C_1$ to $C_4$ alkoxy group and at least one primary, secondary or tertiary amine group, the particulate filler material present in the composition at a level of from 0.1 to 100 parts by weight per 100 parts by weight of the elastomeric copolymer.

The invention also provides a thermoplastic polymer composition comprising a blend of a thermoplastic polymer and the composition described above.

The invention further provides a process for increasing the viscosity of a halogenated elastomeric copolymer of a $C_4$ to $C_7$ isomonoolefin and a para-alkylstyrene comprising melt mixing the copolymer with 0.1 to 100 parts by weight silica or clay filler which has been contacted with an aminosilane containing at least one $C_1$ to $C_4$ alkoxy group and at least one primary, secondary or tertiary amine group, the parts by weight based on 100 parts by weight of the copolymer.

Using the aminosilane modified fillers in accordance with this invention, the viscosity of BIMS polymers can be raised as the result of the introduction of chemical interactions between the amino groups on the filler surface and halogenated isobutylene polymers. For primary and second amine functionalities, covalent bonds can be formed between halogenated isobutylene polymers and the amine modified fillers. For tertiary amine functionality, ionic associations through quaternized amines, instead, are promoted.

It is believed that by associating halogenated isobutylene polymer chains onto the filler surface through either chemical bonds or ionic associations, viscosities of these polymers are enhanced. In addition, chemical absorption of halogenated isobutylene polymer chains onto the filler surface prevents filler agglomeration and, thus, improves filler dispersion. During blending with other polymers, the presence of these interactions between amine-modified fillers and halogenated isobutylene polymers also may prevent filler migration to other polymer phases. Although viscosity value of a polymer could be increased simply by incorporating micro or nano fillers without any functionalities, filler migration is a factor in keeping fillers in the particular polymer phase during blending for their intended purpose of viscosity enhancement. Utilizing functionalized fillers thus solves filler transfer problems.

The invention provides a new approach towards viscosity enhancement of BIMS copolymers such that their viscosity during high shear thermal mixing more closely approaches or matches the viscosity of thermoplastic materials with which they are blended, thereby facilitating more uniform mixing and the development of a finer dispersion of one polymer system within the other matrix polymer system.

DETAILED DESCRIPTION OF THE INVENTION

BIMS elastomeric copolymers used as a blend component in the present invention are the halogenation product of random copolymers of a $C_4$ to $C_7$ isomonoolefin, such as isobutylene, and para-alkylstyrene comonomer, preferably para-methylstyrene containing at least 80%, more preferably at least 90% by weight of the para isomer, and wherein at least some of the alkyl substituent groups present in the styrene monomer units contain halogen.

Most useful of such materials are elastomeric copolymers of isobutylene and para-methylstyrene containing from 0.5 to 20 wt % para-methylstyrene wherein up to 60 mole % of the methyl substituent groups present on the benzyl ring contain a bromine or chlorine atom, preferably a bromine atom. These copolymers have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than 5, more preferably less than 2.5, a preferred viscosity average molecular weight in the range of from 100,000 up to 2,000,000, and a preferred number average molecular weight in the range of from 10,000 to 750,000, as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or chemical initiator.

Preferred brominated copolymers generally contain from 0.1 to 5 mole % of bromomethyl groups, most of which is monobromomethyl, with less than 0.05 mole % dibromomethyl substituents present in the copolymer. More preferred copolymers contain from 0.5 to 1.5 mole % of bromomethyl groups. These polymers, and their method of preparation are more particularly disclosed in U.S. Pat. No. 5,162,445. Useful poly(isobutylene-co-p-methylstyrene) polymers are brominated polymers (BIMS) sold commercially as EXX-PRO™ Elastomers (ExxonMobil Chemical Company, Houston Tex.).

Clays and silicas which are useful fillers in accordance with this invention include silica, fumed or precipitated silica, kaolin, aluminosilicates, magnesium silicates such as talc, mica such as muscovite, calcium metasilicate such as wallastonite and other materials which are capable of hydrolytic reaction with alkoxy-aminosilanes. Preferred fillers are silica and aluminosilicate based clays. The filler desirably has an average particle size in the range of from 0.005 to 25 microns (µm), from 0.005 to 25 µm in another embodiment, and from 0.008 to 5 µm in yet another embodiment.

In accordance with a desirable embodiment of the invention, the BIMS polymer useful in the blends of the invention are contacted with at least one aminosilane compound. In one embodiment, the BIMS and aminosilane are contacted prior to mixing with the at least one thermoplastic. The BIMS/aminosilane (filler) blends thus have improved viscosity matching with the thermoplastics to be blended with the BIMS.

Aminosilanes used to modify the filler materials are known in the art and generally contain at least one $C_1$ to $C_3$ alkoxy group and at least one primary, secondary or tertiary amine group. These silanes may be characterized as compounds having in a single molecule one or more hydrolytic groups which in the presence of water generate silanol groups (in the case of silica and aluminosilicates) thereby forming covalent bonds with free surface hydroxyl groups on the filler surface via condensation reactions. Also present in the aminosilane molecule are amine groups which, in the case of primary and secondary amines, are capable of forming covalent bonds at the site of benzylic halogen in the BIMS molecules, or non-displacement ionic associations with halogen present in the BIMS molecules where the amine group is tertiary.

Suitable aminosilanes include N-(trimethyoxy-silylpropyl)ethylene diamine, N-(trimethoxy-silylpropyl) N',N'-dimethylene diamine, N-(trimethoxy-silylpropyl) propylene diamine, N-(trimethoxysilylpropyl) diethylene triamine, gamma-aminopropyl triethoxy silane and the like. Most preferred aminosilanes are of the formula $(H_2N—R)_{4-n}Si(OR')_n$ wherein R is $C_1$ to $C_4$ alkylene, $R^1$ is $C_1$ to $C_4$ alkyl and n is a whole number ranging from 1 to 3. Examples of these preferred aminosilanes are triethoxy-aminomethyl silane, triethoxyaminopropyl silane, diaminopropyldiethoxy silane, triaminopropyl ethoxy silane and like materials.

Aminosilane surface modified fillers may contain from 0.1 to 5 wt % of the aminosilane, based on the weight of filler, and are prepared by contacting the filler with the aminosilane (either in neat form or in the form of an emulsion), drying the coated filler in an oven, fluidized bed or spray dry process, and screening to the desired particle size. Aminosilane treated clays are commercially available from Burgess Pigment Co. under the designation Burgess 2211 and aminosilane treated silica is available from the Degussa Company under the Aerosil™ designation, such as Aerosil R 504. Other suitable fillers and treated fillers are described in the BLUE BOOK 274-303 (Don R. Smith, ed., Lippincott & Peto, 2001).

The amount of modified filler added to the elastomer to achieve viscosity modification may range from 1 to 100 parts phr (per hundred rubber) in one embodiment, from 2 to 60 parts phr in another embodiment, from 3 to 40 phr in yet another embodiment, and from 5 to 35 phr in yet another embodiment, a desirable embodiment including combination of any upper phr limit with any lower phr limit described herein.

Thermoplastic Polymers

Thermoplastic polymers suitable for use in the present invention include any one or more of amorphous, partially crystalline or essentially totally crystalline polymers selected from polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

Polyolefins suitable for use in the compositions of the invention include thermoplastic, at least partially crystalline polyolefin homopolymers and copolymers, including polymers prepared using Ziegler/Natta type catalysts or metallocene catalysts. They are desirably prepared from monoolefin monomers having 2 to 6 carbon atoms, such as ethylene, propylene, 1-butene, isobutylene, 1-pentene, copolymers containing these monomers, and the like, with propylene being the preferred monomer. As used in the specification and claims, the term polypropylene includes homopolymers of propylene as well as reactor copolymers of propylene which can contain 1 to 20 wt % of ethylene or an α-olefin comonomer of 4 to 16 carbon atoms or mixtures thereof. The polypropylene can be highly crystalline isotactic or syndiotactic polypropylene, usually having a narrow range of glass transition temperature (Tg). Commercially available polyolefins may be used in the practice of the invention.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrolidione, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethyleneadipamide(nylon-6,6), polyhexamethyleneazelamide (nylon-6,9), polyhexamethylenesebacamide (nylon 6,10), polyhexamethyleneisophthalamide(nylon-6, IP) and the condensation product of 11-amino-undecanoic acid (nylon 11). Commercially available thermoplastic polyamides may be advantageously used in the practice of this invention, with linear crystalline polyamides having a softening point or melting point between 160° C.-230° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene C2-6 alkane dicarboxylates such as poly(trans-1,4-cyclohexylene succinate) and poly (trans-1,4-cyclohexylene adipate); poly(cis or trans-1,4-cyclohexanedimethylene) alkanedicarboxylates such as poly(cis 1,4-cyclohexane-dimethylene) oxlate and poly-(cis 1,4-cyclohexane-di-methylene) succinate, poly(C2-4 alkylene terephthalates) such as polyethyleneterephthalate and polytetramethyleneterephthalate, poly(C2-4 alkylene isophthalates) such as polyethyleneisophthalate and polytetramethylene-isophthalate and like materials. Preferred polyester are derived from aromatic dicarboxylic acids such as naphthalenic or ophthalmic acids and C2 to C4 diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear polymers having a glass transition temperature in the range of 190° C. to 235° C. Examples of preferred PPE polymers include poly(2,6-dialkyl-1,4 phenylene ethers) such as poly(2,6 dimethyl-1, 4-phenylene ether), poly 2-methyl-6-ethyl-1,4-phenylene ether), poly-(2,6-dipropyl-1,4-phenylene ether) and poly(2-ethyl-6-propyl-1,4-phenylene ether). These polymers, their method of preparation and blends with polystyrene are further described in U.S. Pat. No. 3,383,435, the complete disclosure of which is incorporated herein by reference.

Other thermoplastics which may be used include the polycarbonate analogs of the polyesters described above such as segmented poly(ether co-phthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenyl sulfone and like engineering resins as are known in the art.

The thermoplastic may be added to the BIMS or BIMS/aminosilane blend from 10 to 90 wt % based on the total weight of the thermoplastic blend, and from 20 to 80 wt % in another embodiment, and from 30 to 70 wt % in another embodiment, and from 35 to 65 wt % in yet another embodiment, wherein a desirable wt % range of the thermoplastic in the thermoplastic/BIMS/aminosilane blend can be any combination of any upper wt % limit with any lower wt % limit described herein.

Additives

The compositions of the invention may include plasticizers, curatives and may also include reinforcing and non-reinforcing fillers, antioxidants, stabilizers, rubber processing oil, plasticizers, extender oils, lubricants, antiblocking agents, anti-static agents, waxes, foaming agents, pigments, flame retardants and other processing aids known in the rubber compounding art. Such additives can comprise up to 50 wt % of the total composition. Fillers and extenders which can be utilized include conventional inorganics such as calcium carbonate, clays, silica, talc, titanium dioxide, carbon black and the like. The rubber processing oils generally are polybutene, paraffinic, naphthenic or aromatic oils derived from petroleum fractions, but are preferably paraffinic or polybutenes. The type will be that ordinarily used in conjunction with the specific rubber or rubbers present in the composition, and the quantity based on the total rubber content may range from zero up to 1-200 parts by weight per hundred rubber (phr). Plasticizers such as trimellitate esters may also be present in the composition.

Processing

The BIMS component of the thermoplastic elastomer is generally present as small, i.e., micro-size, particles within a continuous plastic matrix, although a co-continuous morphology or a phase inversion is also possible depending on the amount of rubber relative to plastic, and the cure system or degree of cure of the rubber. The rubber is desirably at least partially crosslinked, and preferably is completely or fully cross-linked. The partial or complete crosslinking can be achieved by adding an appropriate rubber curative to the blend of thermoplastic polymer and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the component thermoplastic. The rubber is thus simultaneously crosslinked and dispersed as fine particles within the matrix thermoplastic, although as noted above other morphologies may also exist.

Dynamic vulcanization is effected by contacting or otherwise mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

Those ordinarily skilled in the art will appreciate the appropriate quantities, types of cure systems and vulcanization conditions required to carry out the vulcanization of the BIMS rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific BIMS rubber being used and with the thermoplastic component. These curatives include sulfur, sulfur donors, metal oxides, resin systems, peroxide-based systems, hydrosilation curatives, containing platinum or peroxide catalysts, and the like, both with and without accelerators and co-agents. Such cure systems are well known in the art and literature of vulcanization of elastomers.

The term "vulcanized" as used in the specification means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081.

Depending upon the desired applications, the amount of rubber present in the composition may range from 10 to 90 wt % of the total polymer content of the composition. In most applications and particularly where the rubber component is dynamically vulcanized, the rubber component will constitute less than 70 wt %, more preferably less than 50 wt %, and most preferably 10-40 wt % of the total polymer content of the composition.

Melt processing temperatures of the TPE compositions will generally range from above the melting point of the highest melting polymer present in the TPE composition up to 300° C. Preferred processing temperatures will range from 140° C. up to 260° C., more preferably from 150° C. up to 240° C.

The hindered surface modified filler material may be combined with the BIMS rubber component at any mixing stage, i.e., when the BIMS and thermoplastic polymer are initially mixed or at the time that curatives or other additives are mixed where dynamically vulcanized compositions are prepared. However, in a preferred embodiment, the filler material is fist compounded with the BIMS polymer at temperatures up to 300° C. to provide a modified BIMS polymer of increased viscosity, and this modified polymer then blended with the thermoplastic resin and any other additives present in the TPE composition.

The BIMS blend with the aminosilane offers improved viscosity properties that allows for unexpected benefits in blends with thermoplastics. Due to the flow activation energy and shear thinning characteristics of isobutylene-based polymers, reductions in viscosity values of these polymer with an increase in temperature and shear rate are much stronger than that of other polymers, especially of thermoplastics in general. Blending of thermoplastics with isobutylene-based polymers commonly requires high temperatures (>150° C.) and high shear rate (>100 l/s). At these temperatures and shear rates, viscosities of isobutylene-based polymers are significantly lower than that of desirable thermoplastic resins such as polyolefins. However, viscosity matching between the isobutylene-based polymer and their thermoplastic partner during blending is essential in providing uniform mixing and fine blend morphology that are critical in, for example, automotive components such as innerliners, treads and sidewalls. Other uses include impact resistant automotive car parts such as interior and exterior trim, panel and bumper components.

Further, the BIMS/aminosilane blends are useful for innerliners (such as a DVA innerliner) and for treads. In the case for treads, treads compose of elastomer and elastomer blends (typically no thermoplastics). However, by using functionalized fillers, it has been found that the filler partition into the BIMS phase can be controlled and, hence, beneficially raise the BIMS viscosity (during Banbury mixing of elastomer compounds, BIMS viscosity erodes with mixing time and could drop well below that of, e.g., butadiene and other general purpose rubbers due to the increase in temperature with mixing time). Thus, in one embodiment of the invention, the BIMS/aminosilane can form a composition with a general purpose rubber such as butyl rubber, styrene-butadiene rubber, butadiene rubber, polyisoprene, halogenated butyl rubber, natural rubber, nitrile rubber, neoprene rubber, silicon rubber, polyurethane elastomers and other rubbers useful in making such automotive tire components as treads and sidewalls.

Other uses of the blends of the invention include low permeability elastic membranes (such as tire innerliners and protective clothing fabrics); closures for pharmaceutical and food containers; hot melt sealants; molded syringe plunger tips; and molded and extruded automotive components requiring low permeability just as hoses or hose covers.

The blends of the present invention improve the viscosity matching between thermoplastics and isobutylene-based polymer such as BIMS. The viscosity values of the BIMS/aminosilane blends of the present invention at 1000 l/s shear rate range from 200 to 500 Pa·s in one embodiment, and from 200 to 400 Pa·s in another embodiment, and from 200 to 350 Pa·s in yet another embodiment. The viscosity values of the BIMS/aminosilane blends of the present invention at 1500 l/s shear rate range from 110 to 400 Pa·s in one embodiment, and from 120 to 350 Pa·s in another embodiment, and from 130 to 250 Pa·s in yet another embodiment. In blends with a thermoplastic, the dispersion size of the blends BIMS/aminosilane (as measured by AFM) were from less than 1.8 μm (microns) in one embodiment, and from less than 1.5 μm in another embodiment, and from less than 1.2 μm in yet another embodiment, and from less than 1.0 μm in yet another embodiment, and from 0.1 to 1.8 μm in yet another embodiment, and from 0.3 to 1.6 μm in yet another embodiment.

One embodiment of the present invention includes a composition comprising a mixture of a halogenated copolymer of a $C_4$ to $C_7$ isomonoolefin and a para-alkylstyrene; and silica or clay filler which has been contacted with at least one aminosilane. In another embodiment, the composition is dynamically vulcanized. The aminosilane may be described in one embodiment as having at least one $C_1$ to $C_4$ alkoxy group and at least one primary, secondary or tertiary amine group, the filler present in the composition at a level of from 0.1 to 100 parts by weight per 100 parts by weight of the copolymer (phr).

In one embodiment, the copolymer is a brominated copolymer of isobutylene and para-methylstyrene.

In another embodiment, the at least one aminosilane is described by the formula $(H_2N-R_{4-n})-Si-(OR')_n$ wherein R is $C_1$ to $C_4$ alkylene, R' is $C_1$ to $C_4$ alkyl and n is a whole number ranging from 1 to 3.

In yet another embodiment, the filler contains 0.1 to 5 wt % of the aminosilane by weight of the filler-aminosilane blend.

In yet another embodiment, the filler material is silica.

In yet another embodiment, the filler material is clay.

In yet another embodiment, the viscosity value of the copolymer blends at 1000 l/s shear rate range from 200 to 500 Pa·s.

In yet another embodiment, the viscosity value of the copolymer blends at 1500 l/s shear rate range from 110 to 400 Pa·s.

Finally, the $R_B$ value for the BIMS/aminosilane blend is from 20 to 90% in yet another embodiment.

In yet another embodiment of the BIMS/aminosilane blend includes a thermoplastic elastomer composition comprising a blend of at least one thermoplastic polymer and from 10 to 90 wt % of the BIMS/aminosilane blend, based on the total polymer content of the composition. The dispersion size of the blend is measured by AFM are from less than 1.8 μm in a desirable embodiment, and the thermoplastic polymer is selected from polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof in another embodiment.

In yet another embodiment of the BIMS/aminosilane blend includes a general purpose rubber selected from butyl rubber, styrene-butadiene rubber, butadiene rubber, polyisoprene, halogenated butyl rubber, natural rubber, nitrile rubber, neoprene rubber, silicon rubber, polyurethane elastomers, and blends thereof. The general purpose rubber may be present in the same ranges as stated for the thermoplastics above.

The BIMS/aminosilane blend and the thermoplastic blend may be used to make an automotive component such as a tire innerliner, tire tread, tire sidewall, or other impact resistant component of a car, truck, boat or other vehicle.

The following non-limiting examples are illustrative of the invention.

EXAMPLE 1

The rubbers and the amine-modified filler used in the examples are described in Table 1. All viscosity values measured are at 220° C. using a capillary rheometer.

Due to the flow activation and shear thinning of BIMS rubbers, the impact of Mooney increase on viscosity value of BIMS rubber at 220° C. is significant only at low shear rates, ~100 l/s, but non-existent at higher shear rates (as shown in Table 2). Since shear rates at 100 l/s and above are commonly employed in blending rubbers with plastics in mixers and extruders to deliver optimal mixing uniformity and dispersion sizes, other methods in raising the viscosity value of BIMS rubber are required, as shown in Table 2.

A two-roll mill blended the Burgess 2211 clays into BIMS 89-4. Clay contents used were 5 phr (part per hundred of polymer) and 50 phr. As shown in Table 3, by adding more than 5 phr of Burgess 2211 clay, viscosity values at all shear rates of BIMS at 220° C. could be raised.

A Brabender blended the Aerosil R504 silica into BIMS 89-4 at 150° C. and 60 RPM. Silica contents used were 10 phr and 25 phr. As shown in Table 4, viscosity values at all shear rates of BIMS at 220° C. could be raised by adding aminosilane treated silica. Due to the small sizes of these silica particles, viscosity enhancement in BIMS is more significant by using the silica instead of the clay.

EXAMPLE 2

Polypropylene PP4292 from ExxonMobil Chemical was selected as the thermoplastic blend component with BIMS. PP4292 is a high-viscosity-grade isotactic polypropylene with MFR of 1.5. A 60/40 by weight blend of PP4292 with BIMS (EXXPRO™ 89-4) and BIMS containing aminosilane treated silica (25 phr of Aerosil R504) were prepared using a Brabender mixer at 80 RPM and 220° C. Morphologies of resulting blends were examined by AFM followed by image processing to determine the dispersion sizes. As shown in Table 5, finer dispersions were obtained in blends with enhanced-viscosity BIMS.

One of the methods in achieving the reduction in dispersion size is by viscosity matching. By raising the viscosity value of BIMS through the addition of fillers such as the aminosilane, viscosity of filled BIMS is brought up to that of thermoplastics such as polypropylene. The usage of fillers is one method of raising the viscosity of elastomer in the present invention. However, the non-functionalized fillers, without specific functionality to react with BIMS, such as carbon black and silica, would thermodynamically and kinetically partition and distribute among the thermoplastic and BIMS phases and, thus, adversely affect the intent in raising the viscosity of the rubber phase. The advantages of the present invention are thus achieved with the aminosilane fillers. The reduction in dispersion size is due to the viscosity matching.

This is useful in thermoplastic blends with BIMS, vulcanized or unvulcanized, for thermoplastic elastomer applications in areas of impact modified plastics and low permeability thermoplastic elastomer.

EXAMPLE 3

A further example of an enhanced viscosity blend of a BIMS polymer and an aminosilane is described with reference to Table 6. Mixing of the silica filled stocks (10 and 30 phr of Aerosil R504) based on EXXPRO™ 90-10 was carried out in a Brabender mixer (started at 25° C. and 40 rpm, mixed for 8 min; changed to 60 rpm, mixed for 1 min and discharged at 93° C.), followed by sheeting on a two-roll mill to provide a high level of silica dispersion. No additives other than the filler were added in these BIMS/aminosilane blends.

Bound rubber is the amount of rubber unextractable from the unvulcanized polymer/filler blend after immersion in a solvent such as cyclohexane (in which the rubber is completely soluble) at room temperature for a duration of one week. Bound rubber ($R_B$) was then calculated according to the following equation:

$R_B$=[{Wt. of sample after immersion−Wt. of filler in sample}×100%]÷(Wt. of polymer is sample)

A stainless steel thimble was used to contain the polymer/filler blend for solvent extraction. The $R_B$ values in Table 6 indicate that BIMS remains associated with the filler material.

It is expected that, in one embodiment of the invention, the $R_B$ value for the BIMS/aminosilane blends of the invention will range from 20 to 90% in one embodiment, and from 22 to 80% in another embodiment, and from 25 to 60% in yet another embodiment, and from 26 to 45% in yet another embodiment, a desirable range of $R_B$ values including any combination of any upper $R_B$ limit with any lower $R_B$ limit described herein.

Polymers and polymer/filler blends were molded between two pieces of Teflon-coated aluminum foil at 150° C. for 25 min. Molded samples were die-cut into micro-dumbbell specimens as per ASTM D1708 for tensile stress-strain measurements, which were performed at a crosshead speed of 2 in/min and at room temperature using an Instron tester. The stress was calculated based on the undeformed cross-sectional area of the tensile specimen. The results of the measurements are in Table 6.

The large increases in bound rubber, yield stress and tensile strength with the incorporation of amine treated silica filler suggests a strong interaction between the polymer and the filler. This strong polymer/filler interaction will result in an enhanced viscosity, as shown in the last column of Table 6. The peak viscosity was estimated from the yield stress and the strain rate in the tensile elongation process.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Materials Used

| Designation | Description | Material |
|---|---|---|
| BIMS 89-4 | BIMS rubber, 45 ML*<br>0.75 mol % Br<br>5 wt % PMS | EXXPRO ™ 89-4,<br>ExxonMobil Chemical |
| BIMS 91-11 | BIMS rubber, 65 ML<br>1.1 mol % Br<br>5 wt % PMS | EXXPRO ™ 91-11,<br>ExxonMobil Chemical |
| BIMS 90-10 | BIMS rubber, 45 ML<br>1.2 mol % Br<br>7.5 wt % PMS | EXXPRO ™ 91-11,<br>ExxonMobil Chemical |
| 2211 | Aminosilane treated clays,<br>particle size is 1.4 μm | Burgess 2211, Burgess<br>Pigment Company |
| R504 | Aminosilane treated silica,<br>particle size is 12 nm | Aerosil R504, Degussa<br>Company |

*ML is Mooney viscosity measured at 125° C. and 1 s$^{-1}$, error of ± 5 units.

TABLE 2

Viscosity values of BIMS with low and high Mooney values.

| Shear Rate (1/s) | Viscosity* of BIMS 89-4 | Viscosity of BIMS 91-11 |
|---|---|---|
| 100 | 1274 | 1468 |
| 500 | 378 | 383 |
| 1000 | 200 | 197 |
| 1500 | 136 | 133 |

*Measured at 220° C. using a capillary rheometer. Values are in Pa-s.

TABLE 3

Viscosity values of BIMS 89-4 at 220° C. in Pa-s filled with amine-modified clays.

| Shear Rate (1/s) | BIMS 89-4 | BIMS with 5 phr 2211 | BIMS with 50 phr 2211 |
|---|---|---|---|
| 100 | 1274 | 1368 | 1806 |
| 500 | 378 | 385 | 484 |
| 1000 | 200 | 202 | 253 |
| 1500 | 136 | 137 | 171 |
| 5000 | 42 | 42 | 52 |
| 20000 | 11 | 11 | 13 |

TABLE 4

Viscosity values of BIMS 89-4 at 220° C. in Pa-s filled with amine-modified silica.

| Shear Rate (1/s) | BIMS 89-4 | BIMS with 10 phr R504 | BIMS with 25 phr R504 |
|---|---|---|---|
| 100 | 1274 | 1545 | 2266 |
| 500 | 378 | 447 | 619 |
| 1000 | 200 | 236 | 314 |
| 1500 | 136 | 161 | 216 |
| 5000 | 42 | 50 | 67 |
| 20000 | 11 | 13 | 18 |

TABLE 5

Blends of Polypropylene and Enhanced viscosity BIMS

| Blends | Dispersion size (micron)* |
|---|---|
| PP4292/BIMS (control) | 2.08 |
| PP4292/aminosilane treated silica BIMS | 0.91 |

*number average equivalent diameter of the BIMS dispersions.

TABLE 6

Stress Strain measurements of Example 3 samples

| composition | $R_B$, % | Yield Stress, MPa | Tensile Strength, MPa | Breaking Strain, % | Peak Viscosity, Pa·s (estimated) |
|---|---|---|---|---|---|
| EXXPRO ™ 90-10 | 0 | 0.26 | 0.0006 | 2050 | 31.2 × 10$^6$ |
| EXXPRO ™ 90-10, 10 phr R504 | 32 | 0.34 | 0.01 | 650 | 40.8 × 10$^6$ |
| EXXPRO ™ 90-10, 30 phr R504 | 46 | 0.78 | 0.02 | 650 | 93.6 × 10$^6$ |

What is claimed is:

1. A thermoplastic elastomer composition comprising a blend of:
   a) at least one thermoplastic polymer; and
   b) dispersed therein a mixture of from 10 to 90 wt % based on the total polymer content of the composition of a halogenated copolymer of a $C_4$ to $C_7$ isomonoolefin and a para-alkylstyrene, and silica or clay filler which has been contacted with at least one aminosilane having at least one $C_1$ to $C_4$ alkoxy group and at least one primary, secondary or tertiary amine group, the filler present in the composition at a level of from 0.1 to 100 parts by weight per 100 parts by weight of the copolymer;
   said composition further comprising a general purpose rubber selected from the group consisting of butyl rubber, styrene-butadiene rubber, butadiene rubber, polyisoprene, halogenated butyl rubber, natural rubber, nitrile rubber, neoprene rubber, silicon rubber, polyurethane elastomers, and blends thereof.

2. An automotive component made from the composition of claim 1.

3. A process for improving the mixing of a thermoplastic polymer and a halogenated copolymer of a $C_4$ to $C_7$ isomonoolefin and a para-alkylstyrene comprising:
   melt mixing a halogenated copolymer of a $C_4$ to $C_7$ isomonoolefin and a para-alkylstyrene with 0.1 to 100 parts weight of a silica or clay filler which has been contacted at least one aminosilane having at least one $C_1$ to $C_4$ alkoxy group and at least one primary, secondary or tertiary amine group, the parts by weight based on 100 parts by weight of the copolymer, to form a copolymer blend;
   blending at least one thermoplastic polymer with the copolymer blend to dynamically vulcanize the copolymer blend and form a dispersion of the vulcanizate in the thermoplastic polymer; and
   blending at least one of butyl rubber, styrene-butadiene rubber, butadiene rubber, polyisoprene, halogenated butyl rubber, natural rubber, nitrile rubber, neoprene rubber, silicon rubber, polyurethane elastomers, and blends thereof.

4. The mixture of thermoplastic polymer and halogenated copolymer made from the process of claim 3.

5. A process for preparing a blend composition of (a) at least one thermoplastic polymer and from 10 to 90 wt % based on the total polymer content of (b) a dynamically vulcanized composition comprising:
   i) a halogenated copolymer of a $C_4$ to $C_7$ isomonoolefin and a para-alkylstyrene; and
   ii) silica or clay filler which has been contacted with at least one aminosilane having at least one $C_1$ to $C_4$ alkoxy group and at least one primary, secondary or tertiary amine group, the filler present in the composition at a level of from 0.1 to 100 parts by weight per 100 parts by weight of the copolymer;
   comprising mixing (a) with a curable blend of (i) and (ii) to obtain a blend comprising dynamically vulcanized (b) and the thermoplastic polymer; and
   further comprising blending a general purpose rubber selected from the group consisting of butyl rubber, styrene-butadiene rubber, butadiene rubber, polyisoprene, halogenated butyl rubber, natural rubber, nitrile rubber, neoprene rubber, silicon rubber, polyurethane elastomers, and blends thereof.

6. The process of claim 5, wherein a dispersion size of the vulcanized (b) in the blend as measured by AFM is from less than 1.8 μm.

7. The blend composition produced in accordance with the process of claim 6.

8. The process of claim 5, wherein the thermoplastic polymer is selected from the group consisting of polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

9. The process of claim 5, wherein a $R_B$ value for the dynamically vulcanized (b) is from 20 to 90%.

10. The process of claim 3, wherein a dispersion size of the copolymer blend as measured by AFM is from less than 1.8 μm.

11. The process of claim 3, wherein the thermoplastic polymer is selected from the group consisting of polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

12. The process of claim 3, wherein the thermoplastic polymer is a polypropylene homopolymer, impact copolymer, or copolymer.

13. The process of claim 3, wherein a $R_B$ value for the vulcanizate is from 20 to 90%.

14. The composition of claim 1, wherein a dispersion size of (b) in the blend as measured by AFM is from less than 1.8 μm.

15. The composition of claim 1, wherein the thermoplastic polymer is selected from the group consisting of polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

16. A process for improving the mixing of a thermoplastic polymer and a halogenated copolymer of a $C_4$ to $C_7$ isomonoolefin and a para-alkylstyrene comprising:
   contacting a silica or clay filler with at least one aminosilane having at least one $C_1$ to $C_4$ alkoxy group and at least one primary, secondary or tertiary amine group;
   melt mixing a halogenated copolymer of a $C_4$ to $C_7$ isomonoolefin and a para-alkylstyrene with 0.1 to 100 parts by weight of the aminosilane-contacted silica or clay filler, the parts by weight based on 100 parts by weight of the copolymer;
   blending at least one thermoplastic polymer with the copolymer mixture; and
   blending at least one of butyl rubber, styrene-butadiene rubber, butadiene rubber, polyisoprene, halogenated butyl rubber, natural rubber, nitrile rubber, neoprene rubber, silicon rubber, polyurethane elastomers, and blends thereof.

17. An automotive component made from the mixture of claim 4.

18. An automotive component made from the composition of claim 7.

19. The process of claim 3 further comprising making an automotive component from the thermoplastic polymer-halogenated copolymer mixture.

20. The process of claim 5 further comprising making an automotive component from the blend composition.

21. A process for preparing a blend composition of at least one thermoplastic polymer and from 10 to 90 wt % based on the total polymer content of an elastomeric composition, comprising:

preparing a vulcanizable composite comprising:
  i) a halogenated copolymer of a $C_4$ to $C_7$ isomonoolefin and a para-alkylstyrene; and
  iii) silica or clay filler which has been contacted with at least one aminosilane having at least one $C_1$ to $C_4$ alkoxy group and at least one primary, secondary or tertiary amine group, the filler present in the composition at a level of from 0.1 to 100 parts by weight per 100 parts by weight of the copolymer; and
mixing the at least one thermoplastic polymer with the composite at vulcanizing conditions to obtain a blend comprising the dynamically vulcanized composite dispersed in the thermoplastic polymer.

22. The process of claim 21, wherein a dispersion size of the dynamically vulcanized composite as measured by AFM is from less than 1.8 μm.

23. The process of claim 21, wherein the thermoplastic polymer is selected from the group consisting of polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

24. The process of claim 21, wherein a $R_B$ value for the dynamically vulcanized composite is from 20 to 90%.

25. A dynamically vulcanized composition comprising: a blend of:
  a) at least one thermoplastic polymer, and
  b) dispersed therein from 10 to 90 wt. % based on the total polymer content of the composition of a blend comprising a halogenated copolymer of a $C_4$ to $C_7$ isomonoolefin and a para-alkylstyrene vulcanized in a composite mixture with silica or clay filler which has been contacted with at least one aminosilane having at least one $C_1$ to $C_4$ alkoxy group and at least one primary, secondary or tertiary amine group, the filler present in the composition at a level of from 0.1 to 100 parts by weight per 100 parts by weight of the copolymer.

26. The composition of claim 25, wherein the copolymer is a brominated copolymer of isobutylene and para-methylstyrene.

27. The composition of claim 25, wherein the at least one aminosilane is described by the formula $(H_2N-R_{4-n})-Si-OR')_n$, wherein R is $C_1$ to $C_4$ alkylene, R' is $C_1$ to $C_4$ alkyl and n is a whole number ranging from 1 to 3.

28. The composition of claim 25, wherein the aminosilane comprises triethoxypropylaminosilane.

29. The composition of claim 25, wherein the filler contains 0.1 to 5 wt % of the aminosilane by weight of the filler.

30. The composition of claim 25, wherein the filler comprises silica.

31. The composition of claim 25, wherein the filler comprises clay.

32. The composition of claim 25, wherein a viscosity value of the (uncured) composite mixture at 1000 l/s shear rate range from 200 to 500 Pa·s.

33. The composition of claim 25, wherein a viscosity value of the (uncured) composite mixture at 1500 l/s shear rate range from 110 to 400 Pa·s.

* * * * *